United States Patent [19]

Repella

[11] Patent Number: 4,579,514
[45] Date of Patent: Apr. 1, 1986

[54] PRESS LOADING APPARATUS

[75] Inventor: James A. Repella, Berkley, Mich.

[73] Assignee: Microdot Inc., Darien, Conn.

[21] Appl. No.: 634,824

[22] Filed: Jul. 26, 1984

[51] Int. Cl.$^4$ .............................................. B29C 31/08
[52] U.S. Cl. .................................... 425/124; 414/736;
414/751; 425/126 R; 425/338; 425/397
[58] Field of Search ........... 425/112, 124, 125, 126 R,
425/128, 383, 394, 397, 398, 400, 338, 403.1,
145, 110; 414/225, 729, 736, 751; 294/88, 99 R

[56] References Cited

U.S. PATENT DOCUMENTS

| | | | |
|---|---|---|---|
| 2,239,248 | 4/1941 | Rieser | 425/124 |
| 3,456,814 | 7/1969 | Bautz | 414/751 |
| 4,124,242 | 11/1978 | Canner | 425/403.1 |
| 4,190,408 | 2/1980 | Bronkema et al. | 425/398 |
| 4,462,781 | 7/1984 | Alieri | 425/145 |

*Primary Examiner*—Jay H. Woo
*Assistant Examiner*—J. Fortenberry
*Attorney, Agent, or Firm*—Lyman R. Lyon

[57] ABSTRACT

An apparatus and method for loading a front loading molding press in which a loading board is pivoted at one edge on a horizontal pivot shaft which extends into a lower corner of the press opening adjacent one side of the mold in the press. Loading of the press is performed by loading the board with a predetermined array of articles to be molded while the board is in an upwardly pivoted oblique preloading position to one side of the press opening; thereafter pivoting the loaded board downwardly to a loading position directly in front of the press; thereafter sliding the board on the pivot shaft into the press opening to an unloading position directly overlying the mold; and thereafter discharging the articles downwardly onto the mold. The articles are held, transported, and discharged by loading heads which frictionally receive the articles during the preloading operation, frictionally retain the articles during their movement to the loading position and then to the unloading position, and discharge the articles onto the mold upon arrival of the board in the unloading position over the mold.

5 Claims, 4 Drawing Figures

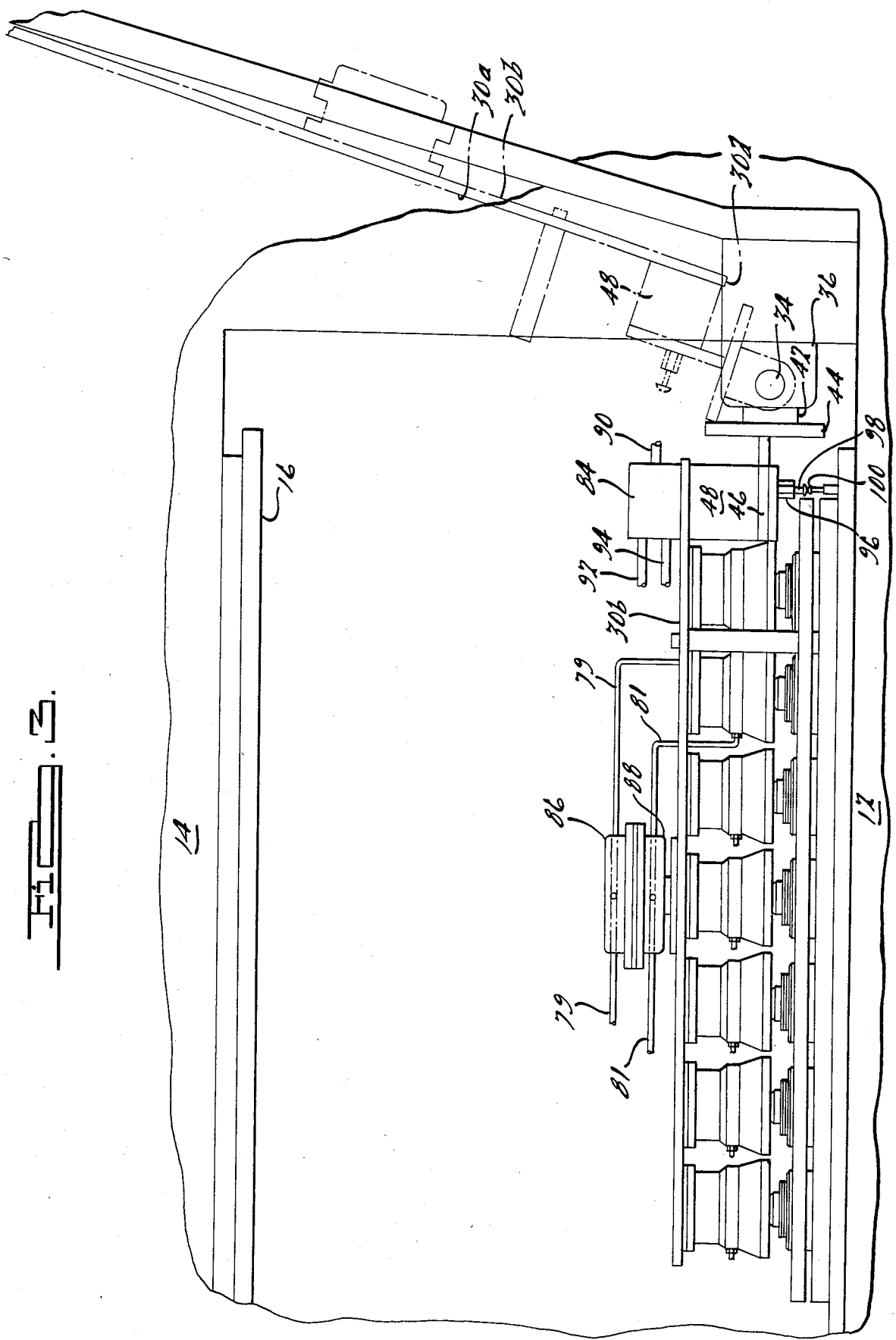

PRESS LOADING APPARATUS

BACKGROUND OF THE INVENTION

This invention relates to press loading methods and apparatus and more particularly to apparatus and methods for loading molding presses.

Molding operations are typically carried out on a high volume batch basis where the total time required to produce a given size batch of molded articles is critical from a manufacturing cost standpoint. Since the time required for the actual molding operation in the press is typically relatively fixed by the particular molding operation being performed, any significant reduction in the total manufacturing time must involve reductions in the time required to load and unload the press. This invention addresses the problem of reducing the time required to load the press. Loading of molding presses was originally done in a totally manual process wherein the press was opened and the operator placed the articles to be molded, individually and by hand, in a predetermined array on the mold. Later attempts at reducing loading time have involved the use of a preloading board or tray where the operator, while the press is closed for a molding operation, prepares a predetermined array of articles on the preloading board and then, upon opening of the press following completion of the molding process, positions the preloading board in the press over the mold and actuates a suitable release mechanism to allow the articles to be transferred downwardly onto the mold. While this preloading system reduces loading time significantly, the loading time still remains a significant part of the total time required to produce the molded part.

SUMMARY OF THE INVENTION

It is accordingly the object of the present invention to provide an apparatus and method for loading a molding press that will minimize loading time.

According to the invention, the articles to be molded are assembled in a predetermined array at a remote preloading location outside of the forward projection of the press opening; the articles are thereafter moved in their predetermined array to a loading location in which they are positioned immediately in front of the press within the forward projection of the press opening; the articles are thereafter moved in their predetermined array into the press opening to a location in the press directly overlying the mold; and the articles are thereafter transferred downwardly in their predetermined array onto the mold.

In the loading apparatus according to the invention, a plurality of loading heads are mounted in a predetermined array on a loading surface of a loading board and the loading board is mounted for movement between a preloading position, a loading position, and an unloading position. In the preloading position, the loading surface of the board is positioned outside of the forward projection of the press opening and has an upwardly facing component to facilitate loading of a predetermined array of articles, with gravity assist, into the loading heads. In the loading position, the board lies directly in front of the press within the forward projection of the press opening with the loading surface of the board at the underside of the board to position the loading heads and the predetermined array of articles held therein on the underside of the board. In the unloading position of the board, the board is positioned horizontally in the press directly overlying a mold in the press with the loading heads at the underside of the board to allow transfer of the articles downwardly onto the mold by actuation of suitable unloading devices incorporated in the loading heads.

In the disclosed embodiment of the invention, a horizontal pivot shaft extends into a lower corner of the press opening and one edge of the loading board is mounted for pivotal and sliding movement on the pivot shaft so that the board can be pivoted upwardly on the shaft to a preloading position in which it is obliquely disposed with the loading heads facing upwardly, whereafter, following loading of the loading heads, the board may be pivoted downwardly about the pivot shaft to a position within the forward projection of the press opening and then slid into the press opening along the pivot shaft to an unloading position overlying the mold in the press.

BRIEF DESCRIPTION OF THE DRAWINGS

FIG. 3 is a partially fragmentary somewhat schematic view of the invention press loading apparatus.

DETAILED DESCRIPTION OF THE PREFERRED EMBODIMENT OF THE INVENTION

Figure 1:
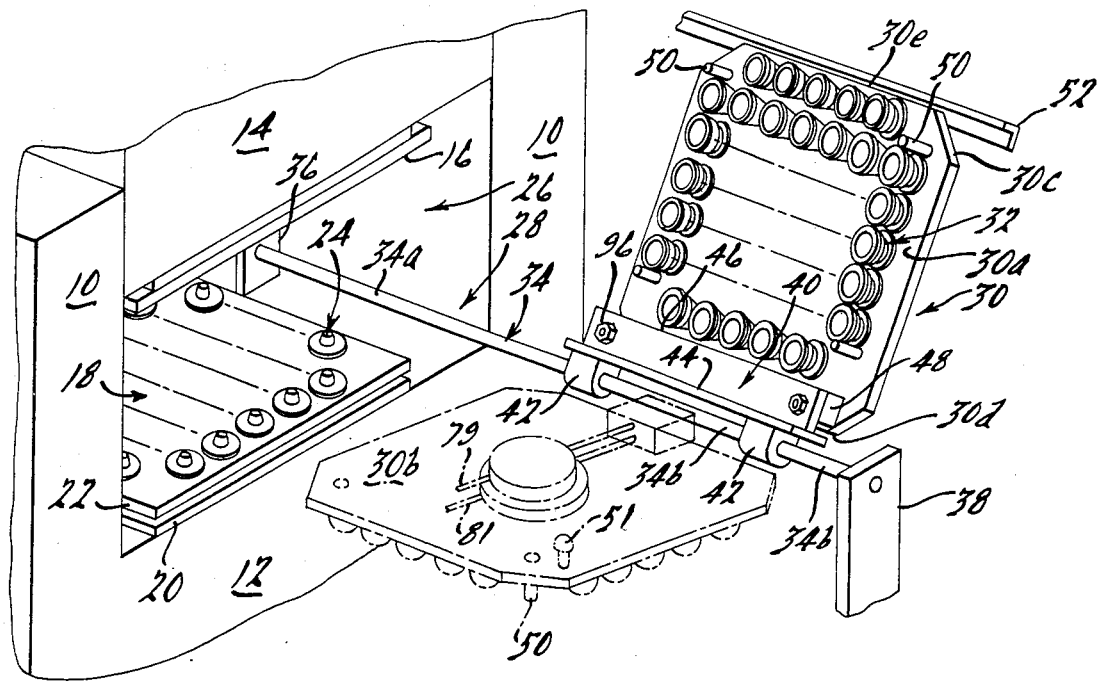
FIG. 1 is a perspective view of a molding press equipped with a press loading apparatus according to the invention.

The invention loading apparatus is seen in FIG. 1 in conjunction with a front loading, down acting molding press of the type including sides 10, a bolster 12, a crown 14, a platen 16, and a mold 18. Platen 16 is shown in its raised position and is movable downwardly to a position directly overlying mold 18 where it coacts with mold 18 to perform a molding operation. Mold 18 is supported on bolster 12 and includes a fixed bottom plate 20, a stripper plate 22, and a predetermined array of mold subassemblies 24 mounted on bottom plate 20 and projecting upwardly for passage through suitable apertures in stripper plate 22. A through press opening 26 is defined between sides 10, the bottom of platen 16 and the top of mold 18.

The invention press loading apparatus includes a pivot shaft assembly 28, a loading board or tray 30, and a plurality of loading heads 32.

Pivot shaft assembly 28 includes a pivot shaft 34, a pillow block 36 fixedly positioned in a lower rear corner of the press opening, and a pillow block 38 fixedly positioned forwardly of the press. Pivot shaft 34 is adapted to be positioned between pillow blocks 36 and 38 with a back shaft portion 34a extending into a lower corner of the press opening alongside of mold 18 and a front portion 34b extending forwardly from the front face of the press for receipt by pillow block 38.

Loading board or tray 30 may comprise a single steel plate of generally rectangular shape having a front or loading face 30a and a back face 30b. The corners of plate 30 are chamfered as at 30c. A pivot assembly 40 pivotably and slidably mounts the edge 30d of board 30 to pivot shaft 34. Pivot assembly 40 includes a pair of spaced pivot blocks 42 slidably journaled on shaft 34, a plate 44 interconnecting blocks 42, a plate 46 mounted normally and centrally to plate 44, and a pair of spacer blocks 48 positioned between plate 44 and loading face 30a of loading board 30 adjacent edge 30d. Four rest pins 50 are mounted rigidly to loading face 30a adjacent the four corners of the plate, and a handle 51 is provided on the back face 30b adjacent one corner of the board. An angle bracket 52, supported for example by the side of the press, coacts with the free edge 30e of the loading board to establish a preloading position in which the board is pivoted upwardly on shaft 34 to an oblique position of, for example, between 20°–30° beyond the vertical.

Figures 2, 4:
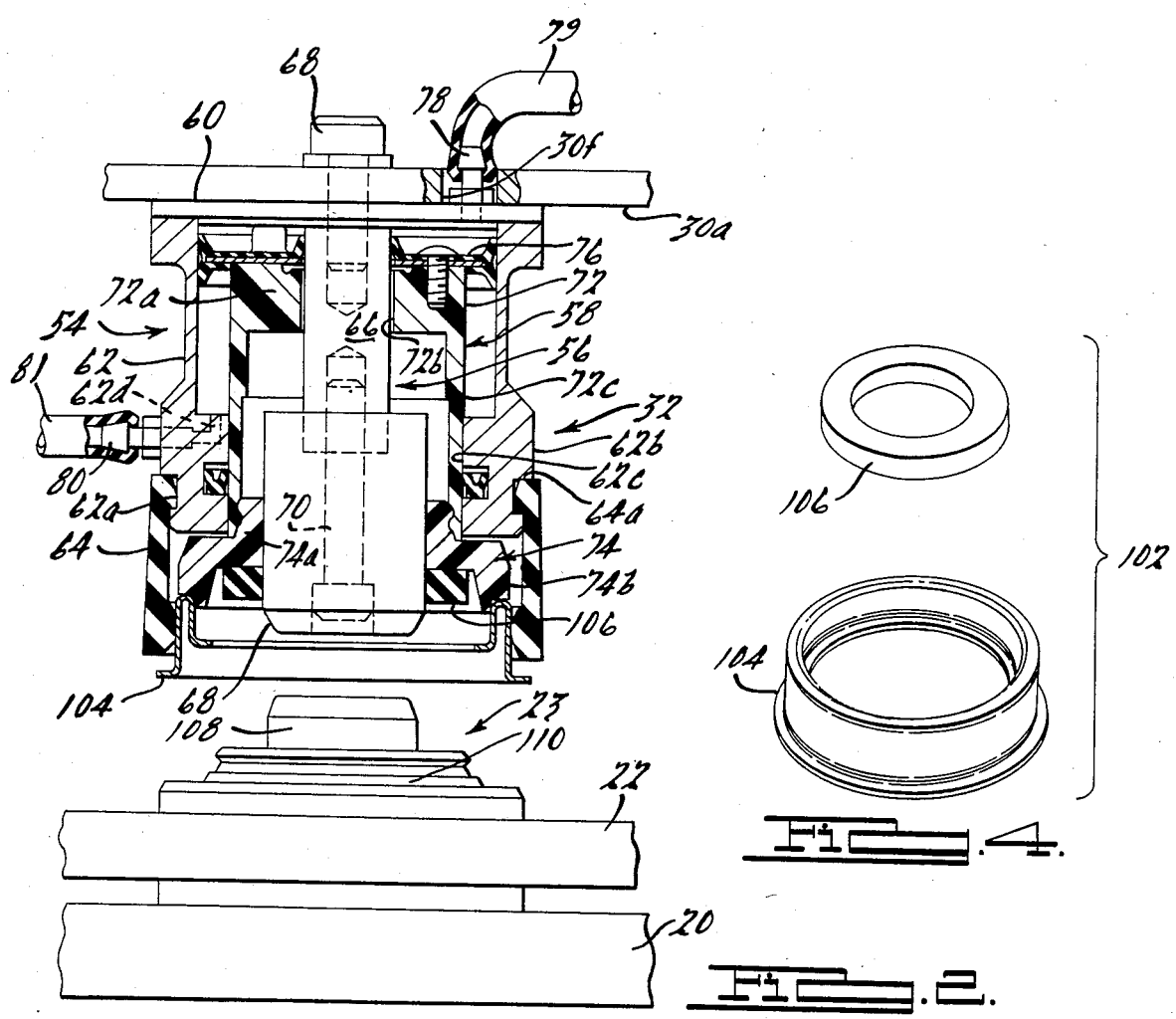
FIG. 2 is a cross-sectional view showing a loading head used in the invention press loading apparatus, shown in conjunction with a portion of a press mold.
FIG. 4 is a perspective view of an article assembly of the type for which the invention loading apparatus is particularly suitable.

Loading heads 32 are mounted in a predetermined array on the loading face 30a of board 30. For example, and as illustrated, 45 loading heads may be provided, arranged in top and bottom rows of five across and five intermediate rows of seven across. Each loading head 32, as seen in FIG. 2, includes a cylindrical housing assembly 54, a post assembly 56, and a piston assembly 58.

Housing assembly 54 includes a metallic mounting plate 60, suitably secured to board face 30a, a metallic cylindrical casing 62 suitably secured at one end to plate 60, and an elastomeric retainer ring 64 mounted on the free end of casing 62 by snapping coaction between retainer ring lip 64a and an external annular groove 62a formed in a thickened outer portion 62b of casing 62.

Post assembly 56 includes an axially inner metallic post member 66 positioned coaxially within housing assembly 54 by a screw 68 passing through apertures in board 30 and plate 60 for threaded engagement with post member 66, and an axially outer post member 68 of polyethylene or the like secured to the free end of member 66 by a screw 70.

Piston assembly 58 constitutes an unloading device for the loading head and includes a cup-shaped piston 72, an ejector member 74, and a seal 76.

Piston 72 is preferably formed of a rigid plastic material such as nylon and includes a base portion 72a, having a central aperture 72b slidably passing inner post member 66, and a cylindrical side wall portion 72c sealingly and slidably engaging the radially inner periphery 62c of thickened outer casing portion 62b.

Ejector member 74 may be formed of polyethylene. Ejector member 74 includes a radially inner annular portion 74a slidably mounted on outer post 68 and including an external groove snappingly coacting with an internal rib adjacent the free end of piston side wall portion 72c to mount ejector member coaxially on the free end of piston 72. Ejector 74 further includes a radially outer annular portion 74b positioned coaxially within retainer ring 64.

Seal 76 is secured to the axially inner face of piston base portion 72a and sealingly coacts at its radially inner periphery with inner post member 66 and at its radially outer periphery with the radially inner periphery of casing 62.

A fitting 78 is secured to mounting plate 60 through an aperture 30f in board 30 to allow pressurized air supplied through an air hose 79 to be admitted to the annular space above seal 76, as viewed in FIG. 2, to move piston assembly 58 downwardly on post assembly 56; and a fitting 80 secured to the side wall of casing 62 allows pressurized air supplied through an air hose 81 to be directed through a casing passage 62d and into the annular space below seal 76 to move piston assembly 58 upwardly on post assembly 56.

Pressurized air is directed to fittings 78 and 80 of each loading head by an air supply system comprising an air manifold 82 and an air valve 84.

Air manifold 82 is secured centrally to back face 30b of loading board 30 and includes an upper manifold section 86, having a plurality of circumferentially spaced fittings communicating with respective air hoses 79, and a lower manifold section 88 having a plurality of circumferentially spaced fittings communicating with respective air hoses 81.

Air valve 84 is mounted on loading board back face 30b adjacent edge 30d. Valve 84 communicates with a source of pressurized air (not shown) through inlet hose 90 and includes two outlet lines 92 and 94 respectively communicating with manifold sections 86 and 88. Valve 84 is controlled by a valve control device 96 secured to plate 46 and including a movable valve stem 98 coacting with an adjustable stop screw 100 upstanding from press bolster 12 adjacent one side edge of mold 18 and adjacent pivot shaft 34.

OPERATION

Although the invention loading method and apparatus are suitable for use with a wide variety of articles to be molded, the specific apparatus disclosed is intended for use with an article assembly 102, as seen in FIG. 4, comprising an outer metal ring 104 and an inner elastomeric ring 106 which will be joined in the molding operation to form an annular seal.

During the time that a series of articles is being molded in the molding press, an operator, standing in front of the closed press, loads a new array of articles into loading heads 32 with loading board 30 disposed in the preloading position seen in solid lines in FIG. 1 and in dotted lines in FIG. 3. Specifically, the operator presses a plurality of elastomeric rings 106 onto respective posts 68 and presses a plurality of metal rings 104 into respective retainer rings 64. The loaded elastomeric rings, as seen in FIG. 2, are frictionally retained on posts 68 and are pressed against inner portion 74a of ejector members 74. The loaded metal rings are frictionally retained within rubber retainer ring 64 and are pressed against outer portion 74b of ejector members 74. The loading face 30a of board 30 has an upwardly facing component in the preloading position of the board to provide gravity assist to the loading operation. The pistons 72 of the loading heads are in their retracted or raised positions at this time by virtue of pressurized air supplied from valve 84 through manifold section 88 to hoses 81.

As soon as the molding operation is completed in the press, platen 16 raises automatically, stripper plate 22 is raised automatically to strip the molded annular seals from mold subassemblies 23, and air is automatically blown across stripper plate 22 to blowingly discharge the molded seals out of the open rear face of the press into a suitable collection facility. The operator now grasps handle 51 and pivots board 30 about shaft 34 upwardly through the vertical and then downwardly until the board is in a loading position within the forward projection of the press opening defined between the raised platen, the top of the mold, and the press sides, whereafter the operator, in a compound motion, slides the board into the press while continuing to pivot the board downwardly about the shaft 34. As the board arrives in position over the mold, the operator completes the downward pivotal movement of the board to bring rest pins 50 into resting engagement with stripper plate 22 and position the respective loading heads immediately over the respective mold subassemblies 24. The board is now in its unloading position. Arrival of board 30 at its unloading position also serves to engage valve stem 98 with stop 100 to raise the valve stem and switch valve 84 to a mode in which pressurized air is delivered to upper manifold section 86 and through hoses 79 to move pistons 72 downwardly in casings 54. Downward movement of pistons 72 moves ejector members 76 downwardly to respectively dislodge elastomeric rings 106 from post 78 and dislodge metal rings 104 from retainer rings 64. As the elastomeric and metal rings are discharged downwardly, the elastomeric rings are frictionally mounted on the central post 108 of the mold subassemblies 24 and metal rings 104 are deposited onto base portions 110 of the mold subassemblies. The downward movement of pistons 72 is limited by abutting engagement of piston base portions 72a with the shoulders formed at the juncture of post members 66 and 68. The operator now pivots board 30 upwardly about shaft 34 while simultaneously sliding the board outwardly on shaft 34 to a position in front of and clear of the press, whereafter the operator pivots the board upwardly on shaft 24 to the preloading position defined by engagement with bracket 52. As the board is pivoted upwardly about shaft 34, valve stem 98 moves clear of stop 100 and moves to a position in which hoses 81 are again pressurized to move pistons 72 to their raised or retracted positions preparatory to another loading operation while the articles recently delivered to the mold are undergoing a molding operation.

The described method and apparatus have been found to reduce press loading time substantially while not in any way derogating from the quality of the actual molding operation.

Whereas a preferred embodiment of the invention has been illustrated and described in detail, it will be apparent that various changes may be made in the disclosed embodiment without departing from the scope or spirit of the invention.

I claim:

1. An apparatus for loading a plurality of articles into a front loading molding press wherein each article comprises an assembly including an outer metal ring adapted to be frictionally held within a retainer ring and an inner elastomeric ring which will be joined to the outer metal ring in the molding operation to form an annular seal, said apparatus comprising:
   A. a loading board assembly including generally planar loading board and a plurality of loading heads mounted in a predetermined array on said board;
   B. means mounting said loading board assembly for movement between
      (1) a first position in which said assembly presents a planar preloading surface having an upwardly facing component, whereby to allow said articles to be loaded, with gravity assist, onto said preloading surface in a predetermined planar array, and
      (2) a second position in which said board is positioned directly in front of the press and said loading heads are positioned on the under surface of said board and respectively hold said predetermined planar array of articles;
   C. means mounting said board for movement from said second position toward and into said press to an unloading position in which said board is positioned in the press in a horizontal position directly overlying a mold in the press;
   D. means on said board associated with said loading heads operative with said board in said unloading position to transfer the predetermined planar array of articles downwardly from said loading heads onto the mold;
   E. each of said loading heads includes
      (1) a cylindrical housing assembly mounted at one end to said board and extending generally normal to the general plane of said board and including a resilient retainer ring positioned at the free end of said housing assembly adapted to frictionally receive and hold an article therewithin, and
      (2) ejector means positioned within said cylindrical housing and operative when actuated to dislodge an article frictionally held by said retainer ring;
   F. each of said loading head further includes a central post positioned coaxially within said housing assembly and having a free end positioned coaxially within said retainer ring of a diameter to frictionally pass and grasp the elastomeric ring of an article assembly; and
   G. said ejector means comprises an annular piston assembly slidably mounted on said post and operative upon sliding movement away from said board to dislodge the elastomeric ring from said post and the metal ring from said retainer ring.

2. An apparatus according to claim 1 wherein:
H. said piston assembly includes
   (1) a cup-shaped piston having a central aperture in its base portion slidably passing said post, and
   (2) an annular ejector member secured to the free annular end of said piston and including an annular inner portion guiding on the free end of said post and adapted to engage and dislodge the elastomeric ring and an annular outer portion adapted to engage and dislodge the metal ring.

3. An apparatus according to claim 2 wherein:
I. said cylindrical housing assembly includes a rigid cylindrical casing secured at one end to said board,
J. said resilient retainer ring is secured to the free annular end of said cylindrical casing,
K. said piston assembly further includes an annular seal secured to the base portion of said piston and having sealing means at its radially inner periphery sealingly engaging said post and sealing means at its radially outer periphery sealingly engaging the inner cylindrical periphery of said casing, and
L. each loading head is air actuated and includes means to admit pressurized air to one side of said annular seal to actuate said piston assembly and eject the elastomeric and metal rings onto said mold and means to admit pressurized air to the other side of said annular seal to return said piston assembly to its loading position.

4. An apparatus for loading a plurality of articles into a front loading molding press comprising:
   A. a pivot shaft adapted to extend into a lower corner of the press opening alongside a mold positioned in the press,
   B. a loading board pivoted along one edge thereof on said pivot shaft and mounted for sliding movement along said shaft,
   C. a plurality of loading heads mounted on one face of said loading board and adapted to respectively receive a plurality of articles to be loaded into the press,
D. means defining an upwardly pivoted preloading position for said board in which said one face of said board is obliquely disposed and upwardly facing, whereby said articles may be loaded into said loading heads with said board in its preloading position, whereafter said board may be pivoted about said pivot shaft to a position in front of the press opening and thereafter slid forwardly on said pivot shaft into the press opening to an unloading position overlying the mold in the press, and
E. each of said loading heads comprising
  (1) a cylindrical casing mounted at one end to said one face of said loading board,
  (2) a resilient retainer ring mounted on the free annular end of said casing,
  (3) a post extending rigidly from said one face of said loading board and positioned coaxially within said casing and said retainer ring, and
  (4) a piston assembly slidably mounted on said post and operative when actuated to dislodge an article frictionally held within said retainer ring.

5. An apparatus according to claim 4 wherein the article to be loaded is an article assembly comprising a relatively large diameter metal ring and a relatively small diameter elastomeric ring which will be joined in the molding operation to form an annular seal and wherein:
F. said retainer ring is sized to frictionally receive a metal ring therewithin,
G. the free end of said post is sized to frictionally receive an elastomeric ring therearound, and
H. said piston assembly includes an ejector member having an annular inner portion guiding on the free end of said post and adapted to engage and dislodge an elastomeric ring positioned therearound and an annular outer portion adapted to engage and dislodge a metal ring held within said retainer ring.

* * * * *